US012112220B1

(12) United States Patent
Tessler et al.

(10) Patent No.: US 12,112,220 B1
(45) Date of Patent: Oct. 8, 2024

(54) AUTHENTICATING A PHYSICAL CARD USING SENSOR DATA

(71) Applicant: Capital One Services, LLC, McLean, VA (US)

(72) Inventors: Leeyat Bracha Tessler, Arlington, VA (US); Alexander Mireles, Clifton, VA (US); Hazar Alsahnawi, Fairfax, VA (US); Dennis Liu, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/348,644

(22) Filed: Jul. 7, 2023

(51) Int. Cl.
*G06K 19/073* (2006.01)

(52) U.S. Cl.
CPC .................................. *G06K 19/073* (2013.01)

(58) Field of Classification Search
CPC .................................................... G06K 19/073
See application file for complete search history.

(56) References Cited

U.S. PATENT DOCUMENTS 8,805,125 B1 * 8/2014 Kumar ................. G06V 30/418 382/321
8,879,783 B1 * 11/2014 Wang ................. G06Q 20/3276 382/176
10,311,223 B2 6/2019 Adams et al.
11,288,679 B2 3/2022 Adams et al.
11,455,786 B2 9/2022 Mattes
2006/0131389 A1 6/2006 Kwon
2010/0008535 A1 1/2010 Abulafia et al.
2014/0270329 A1 * 9/2014 Rowley ................ G06Q 20/102 382/100
2014/0279516 A1 * 9/2014 Rellas .................... G07D 7/206 705/318
2016/0260086 A1 * 9/2016 Cho ................... G06Q 20/3224
2020/0302755 A1 * 9/2020 Edwards ............ G06Q 20/4016

* cited by examiner

*Primary Examiner* — Jamara A Franklin
(74) *Attorney, Agent, or Firm* — Harrity & Harrity, LLP

(57) ABSTRACT

In some implementations, a device may obtain video and/or lidar data relating to a physical card captured while the physical card is flipped from a first side of the physical card to a second side of the physical card. The device may determine an authenticity of the physical card, where the authenticity of the physical card is based at least in part on one or more physical characteristics of the physical card identifiable from the video and/or the lidar data. The one or more physical characteristics may relate to a thickness of the physical card, a length and width of the physical card, a shape of the physical card, and/or a design feature of the physical card. The device may cause, based on a determination that the physical card is authentic, information associated with the physical card to be transmitted or stored to be used in connection with a transaction.

20 Claims, 8 Drawing Sheets

100

105 Obtain an indication that a physical card is to be authenticated

User Device

110 Cause user device to operate in an environment-viewing mode

Real-world environment

Display

100

115 Capture video and/or lidar data of the physical card

User Device

Real-world environment

Display 1234 5678 9101 1121
Exp. 11/25

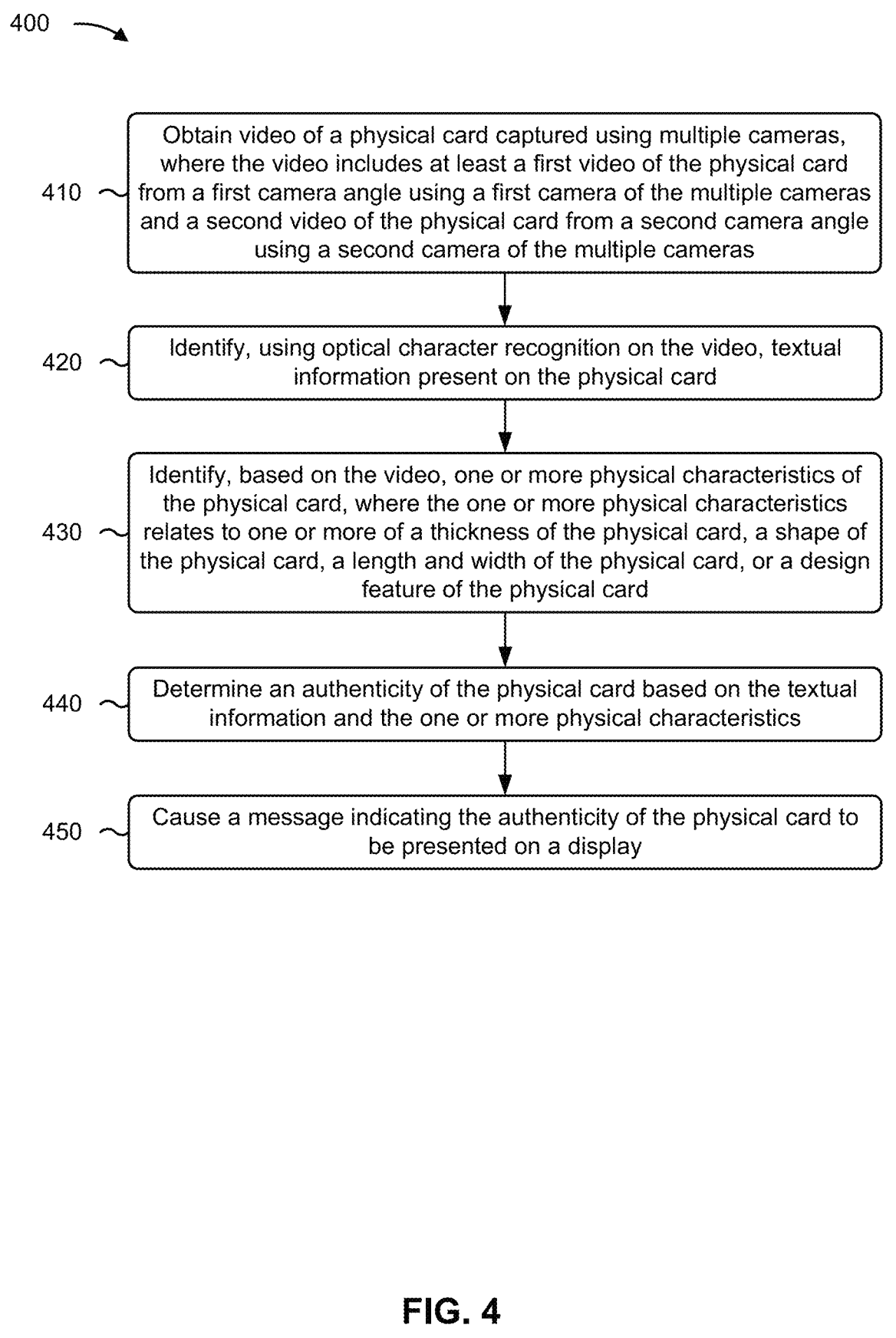

400

410 Obtain video of a physical card captured using multiple cameras, where the video includes at least a first video of the physical card from a first camera angle using a first camera of the multiple cameras and a second video of the physical card from a second camera angle using a second camera of the multiple cameras 420 Identify, using optical character recognition on the video, textual information present on the physical card 430 Identify, based on the video, one or more physical characteristics of the physical card, where the one or more physical characteristics relates to one or more of a thickness of the physical card, a shape of the physical card, a length and width of the physical card, or a design feature of the physical card 440 Determine an authenticity of the physical card based on the textual information and the one or more physical characteristics 450 Cause a message indicating the authenticity of the physical card to be presented on a display

FIG. 4

AUTHENTICATING A PHYSICAL CARD USING SENSOR DATA

BACKGROUND

Extended reality (XR), such as augmented reality (AR), virtual reality (VR), mixed reality (MR), or the like, may refer to computer technologies that use software to integrate real and virtual elements and/or audio to create an immersive experience. For example, AR generally refers to interactive technologies in which objects in a real-world environment are augmented using computer-generated virtual content that may be overlaid on the real-world environment. VR generally refers to fully immersive computer-generated experiences that take place in a simulated environment, often incorporating auditory, visual, haptic, and/or other feedback mechanisms.

SUMMARY

Some implementations described herein relate to a device for authenticating a physical card using sensor data. The device may include one or more memories and one or more processors communicatively coupled to the one or more memories. The one or more processors may be configured to cause the device to operate in an environment-viewing mode in which a real-world environment is viewable via a display of the device. The one or more processors may be configured to capture, in the environment-viewing mode and using multiple cameras of the device, video of a physical card while the physical card is flipped from a first side of the physical card to a second side of the physical card, where the video includes at least a first video of the physical card from a first camera angle using a first camera of the multiple cameras and a second video of the physical card from a second camera angle using a second camera of the multiple cameras. The one or more processors may be configured to transmit an authentication request that includes the video. The one or more processors may be configured to receive an authentication response that includes an indication of an authenticity of the physical card, where the authenticity of the physical card is based at least in part on one or more physical characteristics of the physical card identifiable from the video, and where the one or more physical characteristics relate to one or more of a thickness of the physical card, a length and width of the physical card, or a shape of the physical card. The one or more processors may be configured to cause, based on the indication indicating that the physical card is authentic, information associated with the physical card to be transmitted or stored to be used in connection with a transaction. The one or more processors may be configured to cause, based on the indication indicating that the physical card is authentic, the device to exit the environment-viewing mode.

Some implementations described herein relate to a method of authenticating a physical card using sensor data. The method may include obtaining, by a device, video of a physical card captured using multiple cameras, where the video includes at least a first video of the physical card from a first camera angle using a first camera of the multiple cameras and a second video of the physical card from a second camera angle using a second camera of the multiple cameras. The method may include identifying, by the device and using optical character recognition on the video, textual information present on the physical card. The method may include identifying, by the device and based on the video, one or more physical characteristics of the physical card, where the one or more physical characteristics relates to one or more of a thickness of the physical card, a shape of the physical card, a length and width of the physical card, or a design feature of the physical card. The method may include determining, by the device, an authenticity of the physical card based on the textual information and the one or more physical characteristics. The method may include causing, by the device, a message indicating the authenticity of the physical card to be presented on a display.

Some implementations described herein relate to a non-transitory computer-readable medium that stores a set of instructions. The set of instructions, when executed by one or more processors of a device, may cause the device to obtain at least one of video or lidar data relating to a physical card captured while the physical card is flipped from a first side of the physical card to a second side of the physical card. The set of instructions, when executed by one or more processors of the device, may cause the device to determine an authenticity of the physical card, where the authenticity of the physical card is based at least in part on one or more physical characteristics of the physical card identifiable from the at least one of the video or the lidar data, and where the one or more physical characteristics relate to one or more of a thickness of the physical card, a length and width of the physical card, a shape of the physical card, or a design feature of the physical card. The set of instructions, when executed by one or more processors of the device, may cause the device to cause, based on a determination that the physical card is authentic, information associated with the physical card to be transmitted or stored to be used in connection with a transaction.

BRIEF DESCRIPTION OF THE DRAWINGS

FIG. 4 is a flowchart of an example process associated with authenticating a physical card using sensor data, in accordance with some embodiments of the present disclosure.

DETAILED DESCRIPTION

Figure 1A:
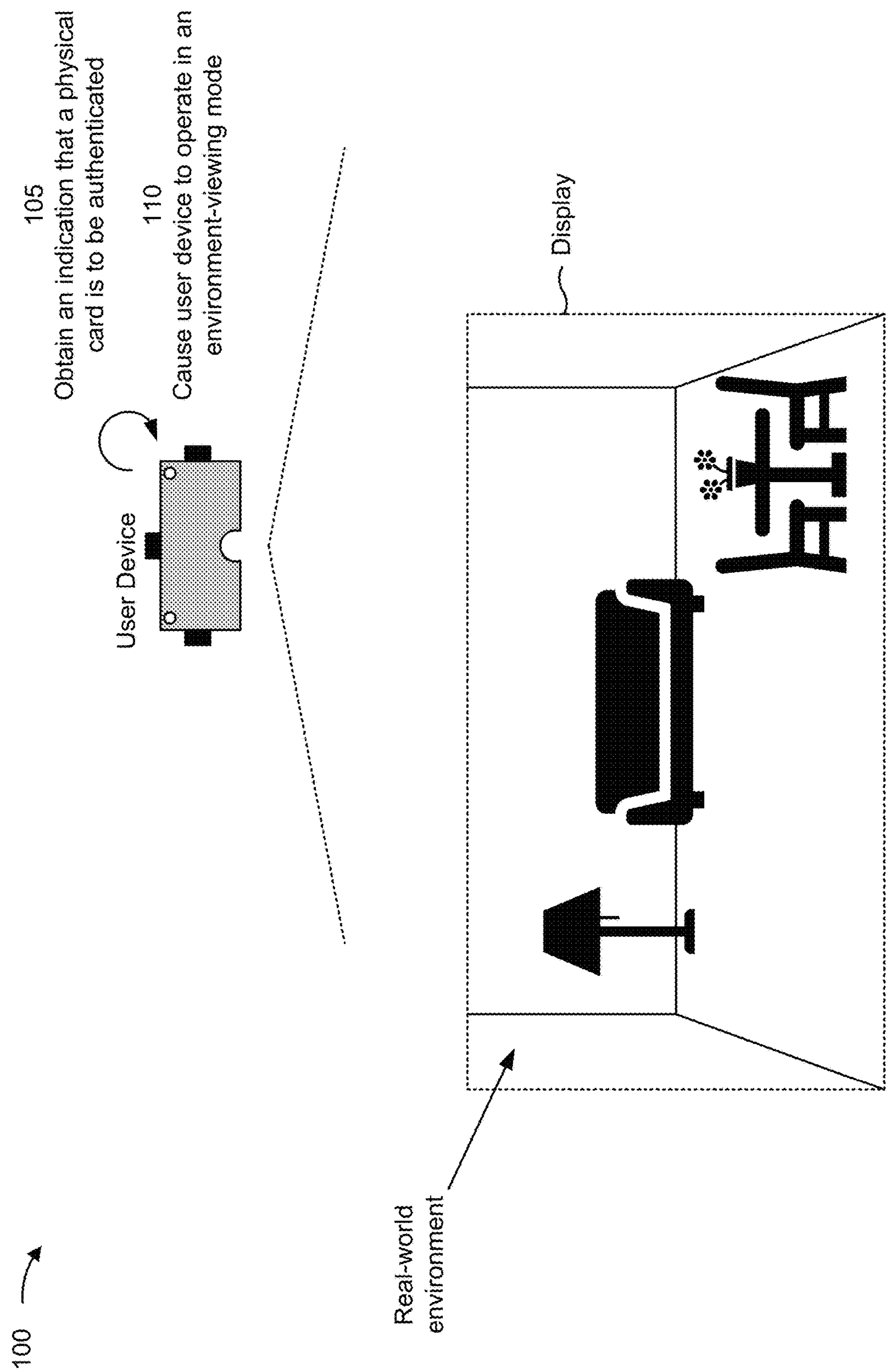
FIGS. 1A-1E are diagrams of an example associated with authenticating a physical card using sensor data, in accordance with some embodiments of the present disclosure.

The following detailed description of example implementations refers to the accompanying drawings. The same reference numbers in different drawings may identify the same or similar elements.

A user device, such as an extended reality (XR) device, may include multiple sensors. For example, the user device may include one or more cameras and/or one or more lidar systems that collect data relating to characteristics of a physical environment of the user device. In XR, this data may be used to determine a position and/or a movement of an XR headset in the physical environment.

A user device may utilize a virtual keyboard that facilitates text entry by a user. For example, a virtual keyboard may be presented (e.g., when needed) on a touchscreen display of a tablet computer or a smartphone, and a user may input text by tapping the touchscreen display where "keys" of the virtual keyboard are located. In XR, a virtual keyboard may be presented on a head-mounted display (HMD) in a user's field of view, and the user may input text by selecting characters using a hand-held controller, gestures, or eye movements. As another option, a user may input text to a user device by speaking into a microphone of the user device, and the user device may use voice recognition to convert the speech to text.

In some examples, a user may need to input information from a physical card (e.g., an identification card, a transaction card, a driver's license, a gift card, or the like) into a user device. However, inputting long sequences of alphanumeric text via a virtual keyboard is difficult and error prone, and voice recognition is often error prone as well. As a result, the text may be input incorrectly, and the user device or another system that processes the text may expend significant computing resources (e.g., processor resources and/or memory resources) processing invalid text and/or requesting and receiving re-entry of the text. Furthermore, in cases of remote verification of the physical card, it is technically difficult to detect an authenticity of the physical card. For example, an image of the physical card may have insufficient detail to enable accurate authentication of the physical card. As a result, the user device or another system may expend significant computing resources (e.g., processor resources and/or memory resources) processing an invalid transaction involving an inauthentic physical card.

Some implementations described herein provide for authentication of a physical card using a user device's sensors. For example, the physical card may be authenticated using video and/or lidar data captured by the user device. In some implementations, the user device may obtain video and/or lidar data during an event in which the physical card is held by a user and flipped from a first side of the physical card to a second side of the physical card. In some implementations, the video may be captured from multiple camera angles using multiple cameras of the user device (e.g., multiple cameras disposed on an HMD). Accordingly, the video captured from multiple camera angles may be used to generate a three-dimensional (3D) model of the physical card.

The video (e.g., a 3D model based on the video) and/or lidar data may be used to identify textual information present on the physical card as well as physical characteristics of the physical card, such as a thickness of the physical card, a length and width of the physical card, a shape of the physical card, or design features of the physical card. In some implementations, the thickness of the physical card, the length and width of the physical card, and/or the shape of the physical card may be identified with respect to a reference object that also appears in the video or that is also detected by the lidar data. The reference object may be a hand-held controller for the user device (e.g., a hand-held controller for a VR system), which provides an accurate and reliable size reference that is generally readily available during use of the user device. The authentication of the physical card may be based on the textual information and/or the physical characteristic(s) that are identified from the video and/or lidar data. Authentication based on the physical characteristic(s) establishes that the user is actually in possession of the physical card.

By using the user device's sensors, the physical card can be authenticated faster, more efficiently, more accurately, and with less errors. Accordingly, techniques described herein conserve computing resources (e.g., processor resources and/or memory resources) that may otherwise have been expended using slower or less efficient authentication of the physical card. For example, techniques described herein reduce input errors associated with manual entry of information present on the physical card, thereby conserving computing resources that may otherwise have been used to process invalid text and/or request and receive re-entry of the text. Furthermore, techniques described herein detect the authenticity of the physical card with greater accuracy, thereby conserving computing resources that may otherwise have been used to process an invalid transaction involving an inauthentic physical card.

FIGS. 1A-1E are diagrams of an example 100 associated with authenticating a physical card using sensor data. As shown in FIGS. 1A-1E, example 100 includes a user device and an authentication system. These devices are described in more detail in connection with FIGS. 2 and 3.

The user device may include one or more sensors configured to sense a physical environment of the user device. The one or more sensors may include one or more cameras and/or one or more lidar systems (e.g., including an optical transmitter and an optical receiver). For example, the user device may include multiple cameras arranged at various locations on the user device (e.g., a left side camera and a right side camera). In some implementations, the user device is an XR device (e.g., a virtual reality (VR) device or an augmented reality (AR) device) capable of providing XR functionality. For example, the user device may include an HMD.

The user device may be associated with a user, and the user may possess one or more physical cards. The authentication system may be associated with an entity, such as a financial institution. One or more of the user's physical cards may have been issued to the user by the entity.

As shown in FIG. 1A, and by reference number 105, the user device may obtain (e.g., receive or generate) an indication that a physical card is to be authenticated. For example, the indication may be an input to the user device provided by the user. The input may indicate that a transaction is to be performed using the physical card (e.g., between the user and a merchant), that information relating to the physical card is to be stored, or that the user's identify is to be verified based on the physical card, among other examples. For example, the input may indicate a request to perform an action relating to the physical card (e.g., performing a transaction, storing card information, or verifying the user's identity). As another example, the indication may be a message provided by an application executing on the user device. The physical card may be an identification card, a transaction card (e.g., a credit card, a debit card, a bank card, or the like), a driver's license, a gift card, a rewards card, or a loyalty program card, among other examples.

As shown by reference number 110, the user device may cause the user device to operate in an environment-viewing mode in which a real-world environment is viewable via a display of the user device. For example, the user device may cause the user device to operate in the environment-viewing mode based on the indication. The environment-viewing mode may be a mixed reality mode of the user device or a passthrough mode of the user device. In the mixed reality mode, the user device may display digital information and/or graphics overlaid on the real-world environment (e.g., which can be viewed directly by the user through a see-through display or displayed by the user device as real-time video that is captured by a camera of the user device). In VR, the passthrough mode of the user device may refer to the mixed reality mode. In AR, the user device may refrain from overlaying digital information and/or graphics in the passthrough mode. In some implementations, to cause the user device to operate in the environment-viewing mode, the user device may cause the user device to switch from operating in a VR mode or an AR mode to operating in the environment-viewing mode. For example, the user device may cause video captured by one or more cameras of the user device to be presented on a display of the user device.

While in the environment-viewing mode, or before entering the environment-viewing mode, the user device may prompt the user to look at the physical card through the display of the user device and/or to flip the physical card from a first side of the physical card (e.g., a front of the physical card) to a second side of the physical card (e.g., a back of the physical card) while the user is viewing the physical card through the display. For example, in the environment-viewing mode, the user device may cause presentation of an AR element (e.g., a digital graphic or text) on the display (e.g., overlaid on video of the real-world environment) that indicates the aforementioned instructions to the user. In some implementations, in the environment-viewing mode, the user device may cause presentation of an AR element (e.g., a digital graphic or text) on the display (e.g., overlaid on video of the real-world environment) that indicates a target location (e.g., a center of the display) for viewing the physical card through the display. For example, the AR element may be a graphic depicting a box, crosshairs, or the like.

In some implementations, the user device may detect when the physical card is in view of the user device. For example, the user device may monitor video of the real-world environment using a camera of the user device. Continuing with the example, the user device may process the video (e.g., process image frames of the video) using a computer vision technique to detect when the physical card appears in the video. Moreover, the user device may cause presentation of AR elements based on monitoring the real-world environment. For example, the user device may cause presentation of a first AR element prompting the user to look at the physical card through the display of the user device, as described herein, prior to detecting that the physical card is in view of the user device. Continuing with the example, after the physical card has been in view of the user device, in a proper orientation, for a threshold time period (e.g., as detected by the user device based on processing the video using computer vision), the user device may cause presentation of a second AR element prompting the user to flip the physical card from a first side of the physical card to a second side of the physical card, as described herein. The user device may cause presentation of the second AR element until the user device detects (e.g., based on processing the video using computer vision) that the physical card has been flipped in a proper orientation.

Figure 1B:
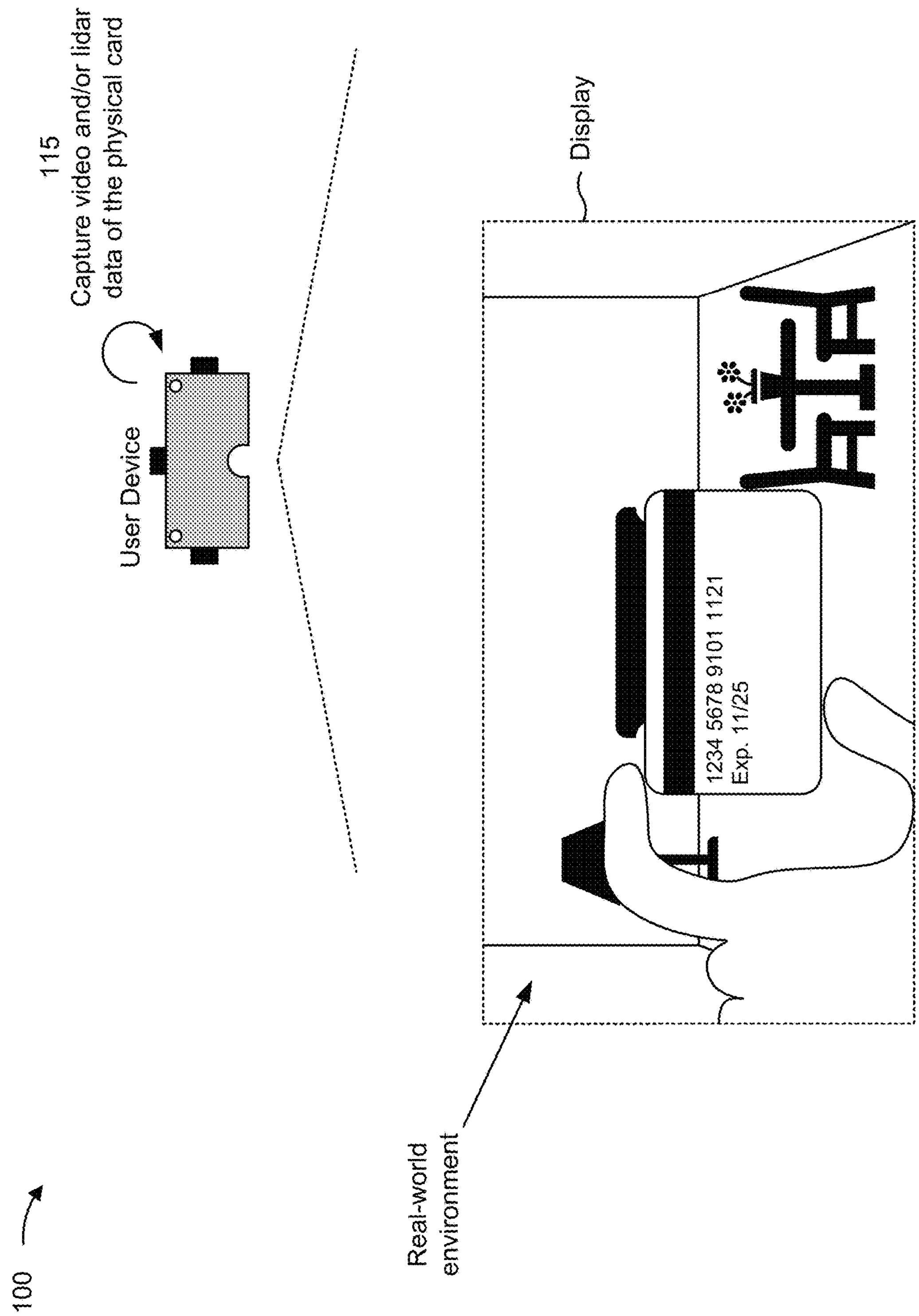

As shown in FIG. 1B, and by reference number 115, the user device may capture (e.g., obtain) video and/or lidar data (e.g., a 3D point cloud) of the physical card while the physical card is in view of the user device. For example, the user device may capture (e.g., initiate capturing) the video and/or the lidar data based on detecting that the physical card is in view of the user device, as described herein. As an example, the user device may capture the video and/or the lidar data while the physical card is flipped from a first side of the physical card to a second side of the physical card.

The user device may capture the video and/or the lidar data in the environment-viewing mode of the user device. The user device may capture the video using the one or more cameras of the user device. The user device may capture the lidar data using the one or more lidar systems of the user device. In some implementations, the video may include multiple videos captured from different camera angles using different cameras of the user device. For example, the video may include at least a first video captured from a first camera angle using a first camera of the user device and a second video captured from a second camera angle using a second camera of the user device.

Figure 1C:
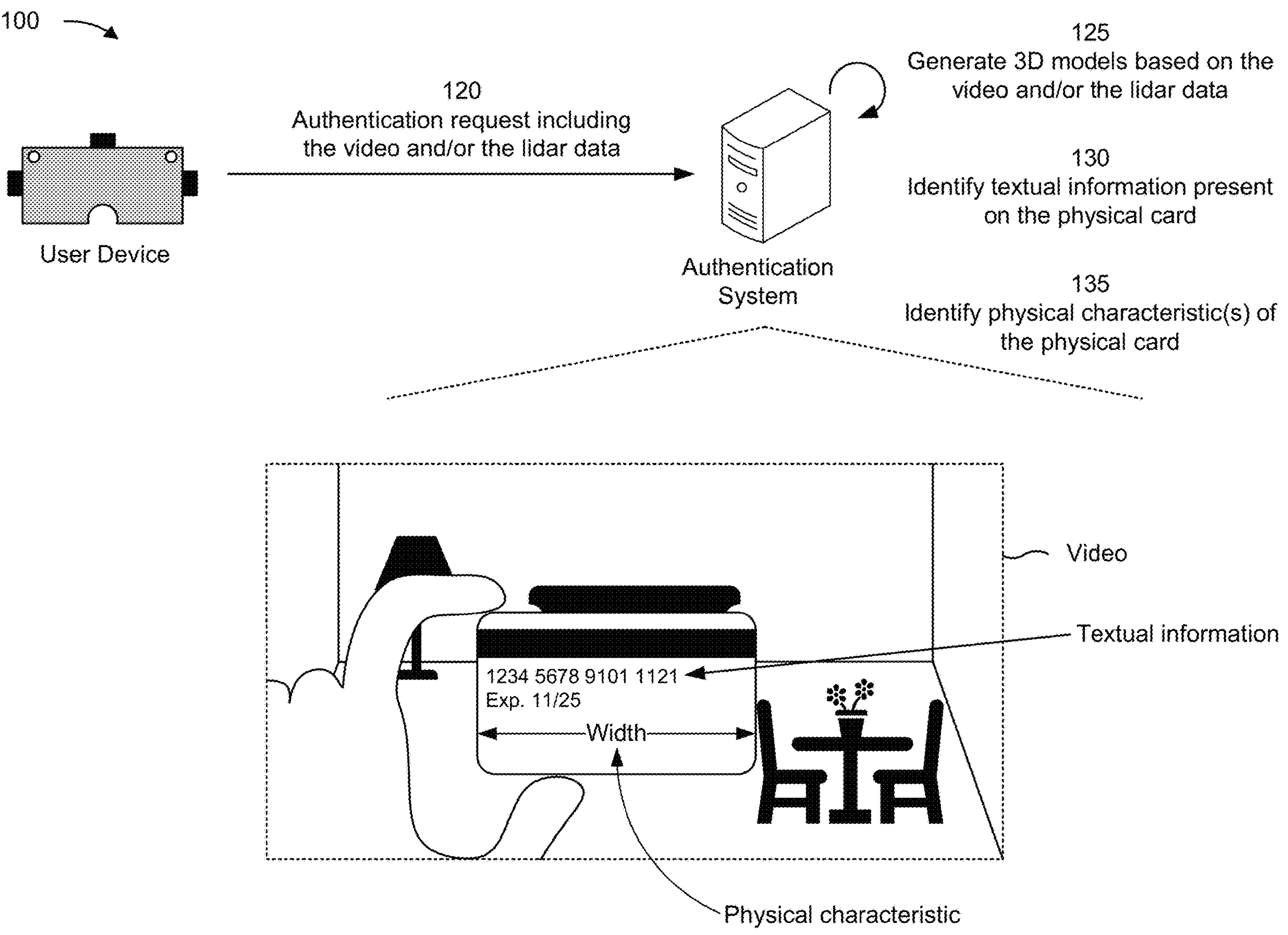

As shown in FIG. 1C, and by reference number 120, the user device may transmit, and the authentication system may receive, an authentication request that includes the video and/or the lidar data captured by the user device. For example, the user device may generate an authentication request that includes the video and/or the lidar data, and the user device may transmit the authentication request to the authentication system. Accordingly, the authentication system may obtain the video and/or the lidar data from the user device.

As shown by reference number 125, the authentication system may generate one or more 3D models based on the video and/or the lidar data. For example, the authentication system may generate a 3D model of the physical card based on the multiple videos captured from different camera angles (e.g., based on the first video and the second video). As an example, the authentication system may extract image frames from the multiple videos, and the authentication system may use a photogrammetry technique to generate a 3D model of the physical card. The photogrammetry technique may include generating a 3D point cloud based on the image frames (e.g., using known distances or angles between the different cameras that captured the multiple videos at different camera angles and/or a reference object also present in the image frames, as described below), and generating a 3D model based on the 3D point cloud. In some implementations, the 3D point cloud may be the 3D model. As another example, the authentication system may generate a 3D model based on the lidar data (e.g., a 3D point cloud). In some implementations, the lidar data may be the 3D model. The multiple cameras of the user device and/or the lidar system of the user device enable the 3D models to be generated, and the 3D models enable characterization of the physical card with a high degree of accuracy.

As shown by reference number 130, the authentication system may identify textual information present on the physical card. For example, the authentication system may identify the textual information using optical character recognition (OCR) on the video (e.g., on one or more image frames of the video). Additionally, or alternatively, the authentication system may identify the textual information using OCR on a two-dimensional (2D) image of a 3D model generated by the authentication system, or using computer vision processing of the 3D model (e.g., if the physical card has embossed text that is present in the 3D model). The textual information may include various pieces of information, such as a name associated with the physical card, an account number (e.g., a credit card number) associated with the physical card, an issuer of the physical card, a type of the physical card, and/or an expiration date of the physical card. In some implementations, the authentication system may identify the various pieces of information in the textual information using pattern matching, regular expressions, or the like.

As shown by reference number 135, the authentication system may identify one or more physical characteristics of the physical card. A physical characteristic may relate to a thickness (e.g., a thickness dimension) of the physical card, a length and width (e.g., length and width dimensions) of the physical card, a shape of the physical card, and/or a design feature of the physical card (e.g., a logo on the physical card, a graphic on the physical card, a color scheme of the physical card, a material of the physical card, a light reflectivity of the physical card, and/or a light transmittance through the physical card, among other examples).

The authentication system may identify the one or more physical characteristics based on the video and/or the lidar data. Additionally, or alternatively, the authentication system may identify the one or more physical characteristics based on the one or more 3D models. The authentication system may identify the one or more physical characteristics using a computer vision technique. In some implementations, the authentication system may process the video (e.g., one or more image frames of the video) using the computer vision technique (e.g., segmentation, edge detection, contour analysis, template matching, and/or a deep learning technique) to identify the physical card (e.g., to identify edges of the physical card). Furthermore, using the computer vision technique, the authentication system may identify one or more design features of the physical card and/or a shape of the physical card.

In some implementations, the authentication system may extract one or more image frames from the video to use in identifying the one or more physical characteristics. For example, the authentication system may extract one or more first image frames that depict the physical card from a front view or a back view and extract one or more second image frames that depict the physical card from a side view. The authentication system may use the computer vision technique to identify the one or more first image frames and/or the one or more second image frames (e.g., the one or more first image frames may include a maximum area of pixels associated with the physical card and the one or more second image frames may include a minimum area of pixels associated with the physical card).

The authentication system may identify the thickness of the physical card and/or the length and width of the physical card based on the video (e.g., the extracted image frames). For example, the authentication system may use the one or more first images to identify the length and width of the physical card, and the authentication system may use the one or more second images to identify the thickness of the physical card.

In some implementations, the authentication system may identify the thickness of the physical card and/or the length and width of the physical card based on the multiple videos captured from different camera angles. For example, the authentication system may determine, based on the first video, a first measurement of the thickness of the physical card and/or the length and width of the physical card, and the authentication system may determine, based on the second video, a second measurement of the thickness of the physical card and/or the length and width of the physical card (e.g., the first measurement and the second measurement may be different due to the different camera angles associated with the first and second videos). Continuing with the example, the authentication system may identify the thickness of the physical card and/or the length and width of the physical card based on the first measurement, the second measurement, and a relationship between the first camera and the second camera. For example, the relationship between the first camera and the second camera may relate to a distance between the first camera and the second camera, may relate to an angular difference between a center of a field of view of the first camera and a center of a field of view of the second camera, and/or may relate to the first camera angle and the second camera angle, among other examples.

Additionally, or alternatively, the authentication system may identify the thickness of the physical card and/or the length and width of the physical card based on a reference object that also appears in the video (e.g., in the one or more extracted image frames) with the physical card. For example, the reference object may be a hand-held controller for the user device (e.g., a hand-held controller for a VR device), which has a known and standardized size. Accordingly, based on a first quantity of pixels associated with a known dimension of the reference object, the authentication system may determine an unknown dimension of the physical card associated with a second quantity of pixels.

In some implementations, the authentication system may identify the thickness of the physical card, the length and width of the physical card, and/or the shape of the physical card based on one or more 3D models. For example, the authentication system may take measurements between points on a 3D model to identify the thickness, the length and width, and/or the shape. A scale of a 3D model may be based on the reference object, in a similar manner as described above.

Figure 1D:
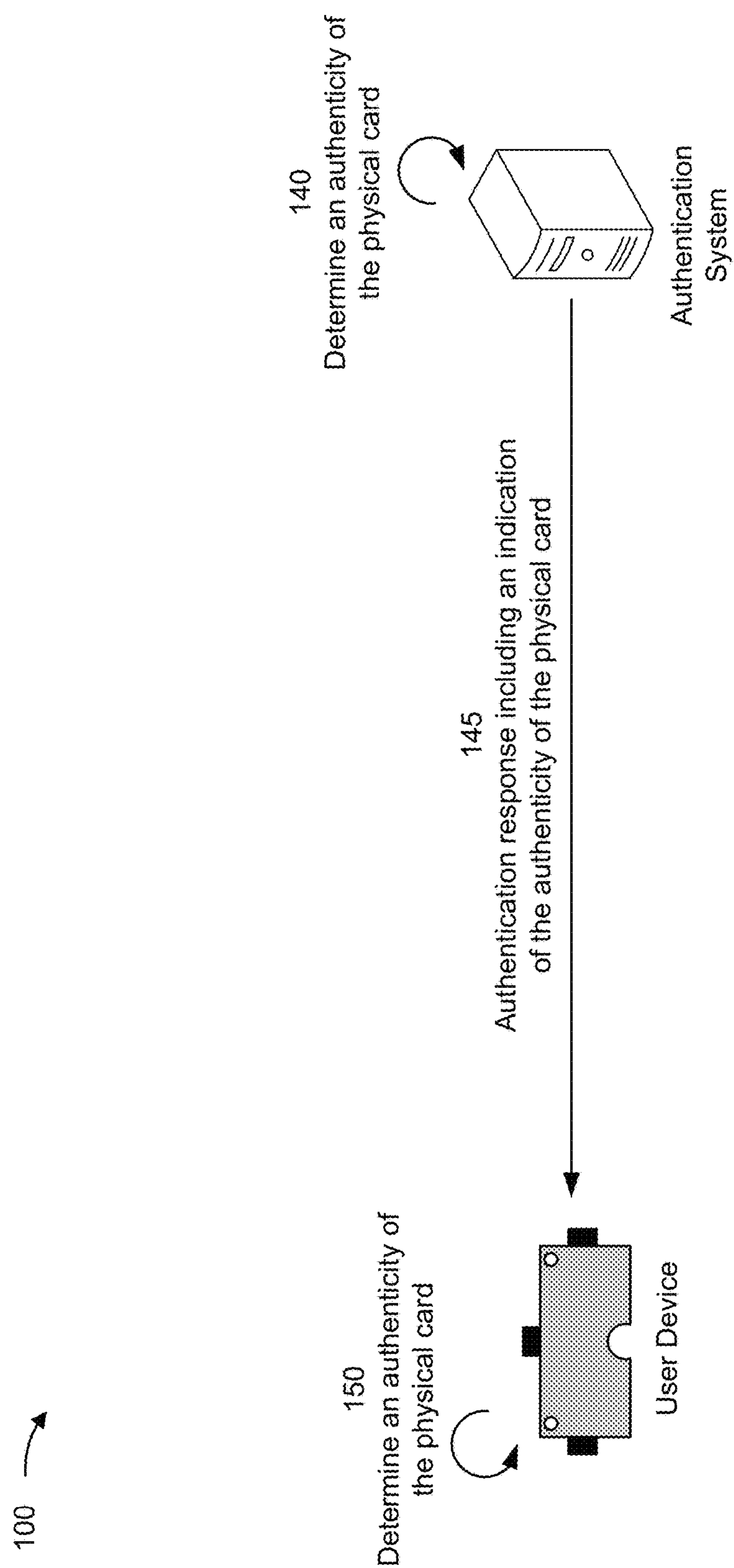

As shown in FIG. 1D, and by reference number 140, the authentication system may determine an authenticity of the physical card based on the textual information and/or the one or more physical characteristics. For example, the authentication system may determine whether the physical card is authentic or inauthentic. The authenticity of the physical card may be based on the textual information present on the physical card that is identifiable from the video and/or the lidar data (e.g., if the textual information is embossed on the physical card). Additionally, or alternatively, the authenticity of the physical card may be based on the one or more physical characteristics of the physical card that are identifiable from the video and/or the lidar data.

For example, to determine the authenticity of the physical card, the authentication system may determine that a number in the textual information corresponds to an account number (e.g., an actual account number for an account maintained by the entity), and the authentication system may determine that a name in the textual information is associated with the account number (e.g., one or more records of the entity indicate an association between the name and the account number). The number corresponding to the account number and the name being associated with the account number may be indicative of the authenticity of the physical card. For example, the number corresponding to the account number and the name being associated with the account number may indicate that information present on the physical card is authentic, but does not necessarily indicate that the physical card itself is authentic (e.g., the information may have been stolen and a counterfeit card may have been produced using the information).

As another example, to determine the authenticity of the physical card, the authentication system may determine that a physical characteristic that was identified corresponds to (e.g., is the same as, or is within a tolerance of, such as within +1%) a reference physical characteristic (e.g., the authentication system may store a set of reference characteristics indicating a thickness, a length, a width, a shape, and/or one or more design features associated with an authentic physical card). The physical characteristic corresponding to the reference physical characteristic may be indicative of the authenticity of the physical card. In some implementations, the physical characteristic corresponding to the reference physical characteristic is indicative of the authenticity of the physical card only if all physical characteristics identified by the authentication system correspond to respective reference characteristics. The physical characteristic corresponding to the reference physical characteristic may indicate that the physical card itself is authentic (e.g., the physical card is not counterfeit nor is the physical card a printout of an authentic card). This may be referred to as authenticating a "liveness" of the physical card.

As shown by reference number 145, the authentication system may transmit, and the user device may receive, an authentication response that includes an indication of the authenticity of the physical card (e.g., based on the authentication system determining the authenticity of the physical card). The indication may indicate whether the physical card is authentic or inauthentic. By transmitting the indication, the authentication system may cause the user device to perform one or more actions described below. For example, by transmitting the indication, the authentication system may cause a message indicating the authenticity of the physical card to be presented on the display of the user device. In some implementations, the authentication response may further identify the textual information and/or the physical characteristics.

As shown by reference number 150, the user device may determine an authenticity of the physical card. For example, the user device may determine the authenticity of the physical card based on the indication from the authentication system. In some implementations, the user device may perform one or more operations, that are described above as being performed by the authentication system, to determine an authenticity of the physical card (e.g., the user device may not transmit the video and/or the lidar data to the authentication system, and the user device may not receive the indication of the authenticity of the physical card from the authentication system). For example, the user device may generate one or more 3D models, identify textual information present on the physical card, identify one or more physical characteristics of the physical card, and/or determine an authenticity of the physical card based on the textual information and/or the one or more physical characteristics, in a similar manner as described above.

Figure 1E:
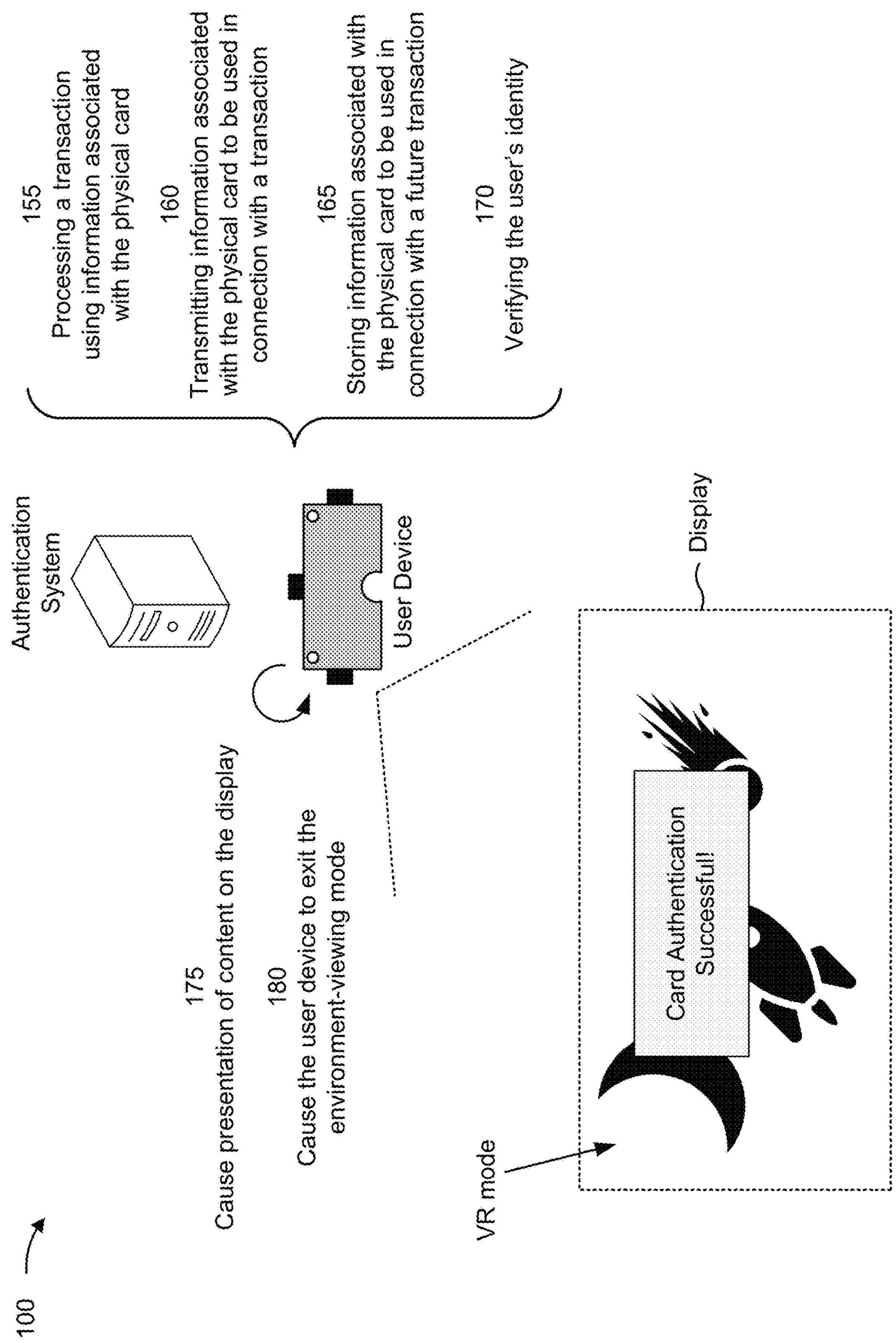

The authentication system and/or the user device may perform one or more actions based on a determination (or an indication) that the physical card is authentic. As shown in FIG. 1E, and by reference number 155, an action may include processing a transaction (e.g., between the user and a merchant) using information associated with the physical card (e.g., an account number and/or an expiration date). As shown by reference number 160, an action may include transmitting (e.g., to a merchant device or a payment processing device) information associated with the physical card (e.g., an account number and/or an expiration date) to be used in connection with a transaction (e.g., between the user and a merchant). For example, the information may be transmitted to a server device that is processing the transaction. As shown by reference number 165, an action may include storing information associated with the physical card (e.g., an account number and/or an expiration date) to be used in connection with a future transaction. As shown by reference number 170, an action may include verifying the user's identity (e.g., the physical card may be a second authentication factor for the user's identity). For example, the user being in possession of the physical card may indicate that the user is the same person as the person associated with the name on the physical card.

In some implementations, as shown by reference number 175, the user device may cause, based on a determination (or an indication) that the physical card is authentic, presentation of content (e.g., AR content or VR content) on the display. In some implementations, the user device may cause (e.g., based on receiving the indication of the authenticity from the authentication system and/or based on determining the authenticity) a message indicating the authenticity of the physical card to be presented on the display. For example, the user device may cause, based on a determination (or an indication) that the physical card is authentic, presentation of content (e.g., AR content or VR content) on the display indicating that the physical card is authentic (e.g., a message or graphic indicating successful authentication). In some implementations, the user device may cause, based on a determination (or an indication) that the physical card is authentic, presentation of content (e.g., AR content or VR content) on the display that is restricted to users having accounts with a particular entity. For example, the user device may determine that the physical card is associated with the particular entity based on the textual information present on the physical card (e.g., the textual information may indicate an issuer of the physical card that is the particular entity) and/or based on a physical characteristic of the physical card (e.g., the physical characteristic may include a design feature that is associated with the particular entity).

As shown by reference number 180, the user device may cause, based on a determination (or an indication) that the physical card is authentic, the user device to exit the environment-viewing mode. For example, the user device may cause the user device to switch from the environment-viewing mode to a VR mode or an AR mode.

By using the user device's camera(s) and/or lidar system, the physical card can be authenticated faster, more efficiently, more accurately, and with less errors. Accordingly, computing resources (e.g., processor resources and/or memory resources) that may otherwise have been expended using slower or less efficient authentication of the physical card may be conserved. For example, by using the user device's camera(s) and/or lidar system to authenticate the physical card, input errors associated with manual entry of information present on the physical card may be reduced, thereby conserving computing resources that may otherwise have been used to process invalid text and/or request and receive re-entry of the text. As another example, by using the user device's camera(s) and/or lidar system to authenticate the physical card, the authenticity of the physical card may be detected with greater accuracy, thereby conserving computing resources that may otherwise have been used to process an invalid transaction involving an inauthentic physical card.

As indicated above, FIGS. 1A-1E are provided as an example. Other examples may differ from what is described with regard to FIGS. 1A-1E.

Figure 2:
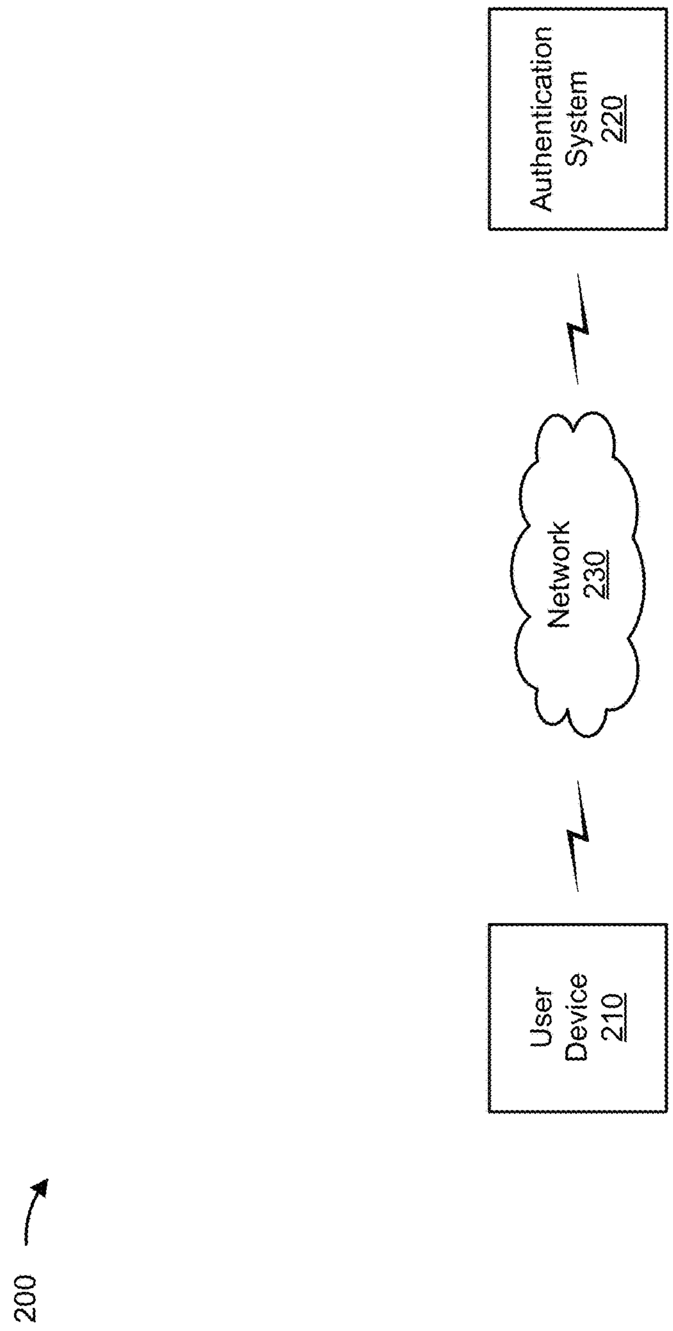
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, an authentication system 220, and a network 230. Devices of environment 200 may interconnect via wired connections, wireless connections, or a combination of wired and wireless connections.

The user device 210 may include one or more devices capable of receiving, generating, storing, processing, and/or providing information associated with authenticating a physical card using sensor data, as described elsewhere herein. The user device 210 may include a communication device and/or a computing device. For example, the user device 210 may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The authentication system 220 may include one or more devices capable of receiving, generating, storing, processing, providing, and/or routing information associated with authentication of a physical card using sensor data, as described elsewhere herein. The authentication system 220 may include a communication device and/or a computing device. For example, the authentication system 220 may include a server, such as an application server, a client server, a web server, a database server, a host server, a proxy server, a virtual server (e.g., executing on computing hardware), or a server in a cloud computing system. In some implementations, the authentication system 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
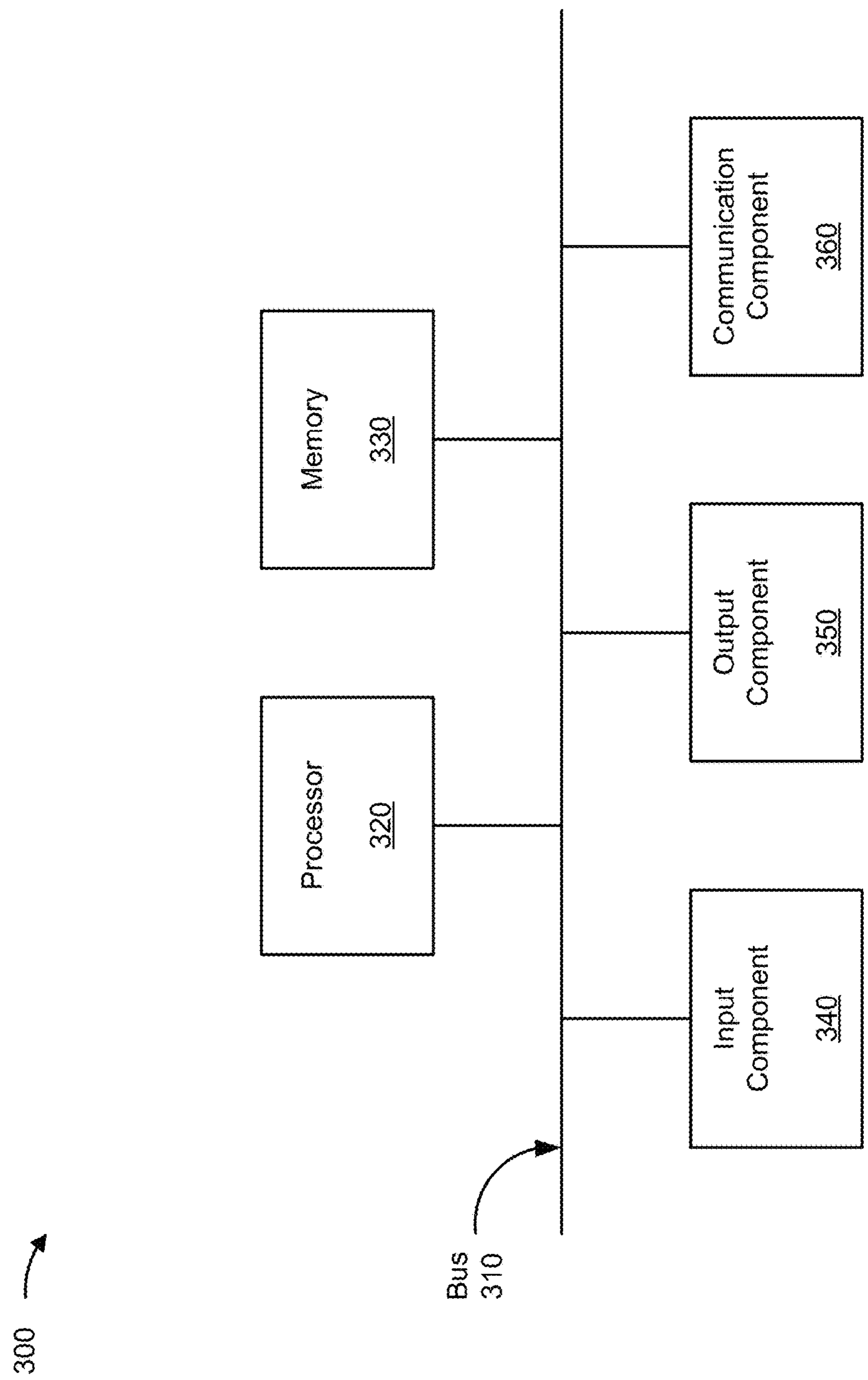
FIG. 3 is a diagram of example components of a device associated with authentication of a physical card using sensor data, in accordance with some embodiments of the present disclosure.

FIG. 3 is a diagram of example components of a device 300 associated with authentication of a physical card using sensor data. The device 300 may correspond to user device 210 and/or authentication system 220. In some implementations, user device 210 and/or authentication system 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with authenticating a physical card using sensor data. In some implementations, one or more process blocks of FIG. 4 may be performed by the authentication system 220. In some implementations, one or more process blocks of FIG. 4 may be performed by another device or a group of devices separate from or including the authentication system 220, such as the user device 210. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining video of a physical card captured using multiple cameras, where the video includes at least a first video of the physical card from a first camera angle using a first camera of the multiple cameras and a second video of the physical card from a second camera angle using a second camera of the multiple cameras (block 410). For example, the authentication system 220 (e.g., using processor 320, memory 330, and/or communication component 360) may obtain video of a physical card captured using multiple cameras, as described above in connection with reference number 120 of FIG. 1C. As an example, a user device that captured the video may transmit an authentication request that includes the video and/or the lidar data captured by the user device.

As further shown in FIG. 4, process 400 may include identifying, using optical character recognition on the video, textual information present on the physical card (block 420). For example, the authentication system 220 (e.g., using processor 320 and/or memory 330) may identify, using optical character recognition on the video, textual information present on the physical card, as described above in connection with reference number 130 of FIG. 1C. As an example, the textual information may include various pieces of information, such as a name associated with the physical card, an account number (e.g., a credit card number) associated with the physical card, an issuer of the physical card, a type of the physical card, and/or an expiration date of the physical card.

As further shown in FIG. 4, process 400 may include identifying, based on the video, one or more physical characteristics of the physical card, where the one or more physical characteristics relates to one or more of a thickness of the physical card, a shape of the physical card, a length and width of the physical card, or a design feature of the physical card (block 430). For example, the authentication system 220 (e.g., using processor 320 and/or memory 330) may identify, based on the video, one or more physical characteristics of the physical card, as described above in connection with reference number 135 of FIG. 1C. As an example, based on the first video, a first measurement of the thickness of the physical card and/or the length and width of the physical card may be determined, and based on the second video, a second measurement of the thickness of the physical card and/or the length and width of the physical card may be determined. Continuing with the example, the thickness of the physical card and/or the length and width of the physical card may be identified based on the first measurement, the second measurement, and a relationship between the first camera and the second camera.

As further shown in FIG. 4, process 400 may include determining an authenticity of the physical card based on the textual information and the one or more physical characteristics (block 440). For example, the authentication system 220 (e.g., using processor 320 and/or memory 330) may determine an authenticity of the physical card based on the textual information and the one or more physical characteristics, as described above in connection with reference number 140 of FIG. 1D. As an example, the authenticity of the physical card may be indicated by a number in the textual information corresponding to an account number, a name in the textual information being associated with the account number, and/or a physical characteristic corresponding to a reference physical characteristic.

As further shown in FIG. 4, process 400 may include causing a message indicating the authenticity of the physical card to be presented on a display (block 450). For example, the authentication system 220 (e.g., using processor 320, memory 330, and/or communication component 360) may cause a message indicating the authenticity of the physical card to be presented on a display, as described above in connection with reference number 145 of FIG. 1D. As an example, an authentication response that includes an indication of the authenticity of the physical card may be transmitted to the user device to cause a message indicating the authenticity of the physical card to be presented on the display of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for authenticating a physical card using sensor data, the device comprising:
- one or more memories; and
- one or more processors, communicatively coupled to the one or more memories, configured to:
  - cause the device to operate in an environment-viewing mode in which a real-world environment is viewable via a display of the device;
  - capture, in the environment-viewing mode and using multiple cameras of the device, video of a physical card while the physical card is flipped from a first side of the physical card to a second side of the physical card,
    - wherein the video includes at least a first video of the physical card from a first camera angle using a first camera of the multiple cameras and a second video of the physical card from a second camera angle using a second camera of the multiple cameras;
  - transmit an authentication request that includes the video;
  - receive an authentication response that includes an indication of an authenticity of the physical card,
    - wherein the authenticity of the physical card is based at least in part on one or more physical characteristics of the physical card identifiable from the video, and
    - wherein the one or more physical characteristics relate to one or more of a thickness of the physical card, a length and width of the physical card, or a shape of the physical card;
  - cause, based on the indication indicating that the physical card is authentic, information associated with the physical card to be transmitted or stored to be used in connection with a transaction; and
  - cause, based on the indication indicating that the physical card is authentic, the device to exit the environment-viewing mode.

2. The device of claim 1, wherein the one or more processors, to capture the video of the physical card, are configured to:
- capture the video and lidar data relating to the physical card while the physical card is flipped from the first side to the second side,
- wherein the authentication request includes the video and the lidar data.

3. The device of claim 1, wherein the one or more processors, to cause the device to operate in the environment-viewing mode, are configured to:
- cause the device to switch from operating in a virtual reality mode to operating in the environment-viewing mode.

4. The device of claim 1, wherein the one or more processors are further configured to:
- cause, in the environment-viewing mode, presentation of an augmented reality element that indicates a target location for the physical card.

5. The device of claim 1, wherein the authentication response further identifies at least one of textual information present on the physical card or the one or more physical characteristics, and
- wherein the one or more processors are further configured to:
  - determine that the physical card is associated with an entity based on at least one of the textual information or the one or more physical characteristics; and
  - cause presentation of content on the display that is restricted to users having accounts with the entity.

6. The device of claim 1, wherein the environment-viewing mode is a passthrough mode of the device.

7. The device of claim 1, wherein the device is a virtual reality device.

8. A method of authenticating a physical card using sensor data, comprising:
- obtaining, by a device, video of a physical card captured using multiple cameras,
  - wherein the video includes at least a first video of the physical card from a first camera angle using a first camera of the multiple cameras and a second video of the physical card from a second camera angle using a second camera of the multiple cameras;
- identifying, by the device and using optical character recognition on the video, textual information present on the physical card;
- identifying, by the device and based on the video, one or more physical characteristics of the physical card,
  - wherein the one or more physical characteristics relates to one or more of a thickness of the physical card, a shape of the physical card, a length and width of the physical card, or a design feature of the physical card;
- determining, by the device, an authenticity of the physical card based on the textual information and the one or more physical characteristics; and
- causing, by the device, a message indicating the authenticity of the physical card to be presented on a display.

9. The method of claim 8, wherein determining the authenticity of the physical card comprises:
- determining that a number in the textual information corresponds to an account number; and determining that a name in the textual information is associated with the account number, wherein the number corresponding to the account number and the name being associated with the account number is indicative of the authenticity of the physical card.

10. The method of claim 8, wherein determining the authenticity of the physical card comprises:

determining that a physical characteristic, of the one or more physical characteristics, corresponds to a reference physical characteristic, wherein the physical characteristic corresponding to the reference physical characteristic is indicative of the authenticity of the physical card.

11. The method of claim 8, wherein identifying the one or more physical characteristics of the physical card comprises:

identifying at least one of the thickness of the physical card or the length and width of the physical card based on a reference object in the video, wherein the reference object is a hand-held controller.

12. The method of claim 8, wherein identifying the one or more physical characteristics of the physical card comprises:

generating a three-dimensional model of the physical card based on at least the first video and the second video; and identifying at least one of the thickness of the physical card, the length and width of the physical card, or the shape of the physical card based on the three-dimensional model.

13. The method of claim 8, wherein identifying the one or more physical characteristics of the physical card comprises:

determining, based on the first video, a first measurement of at least one of the thickness of the physical card or the length and width of the physical card;

determining, based on the second video, a second measurement of at least one of the thickness of the physical card or the length and width of the physical card; and identifying at least one of the thickness of the physical card or the length and width of the physical card based on the first measurement, the second measurement, and a relationship between the first camera and the second camera.

14. The method of claim 8, where causing the message indicating the authenticity of the physical card to be presented on the display comprises:

transmitting an indication of the authenticity of the physical card to cause the message indicating the authenticity of the physical card to be presented on the display.

15. A non-transitory computer-readable medium storing a set of instructions, the set of instructions comprising:

one or more instructions that, when executed by one or more processors of a device, cause the device to:

obtain at least one of video or lidar data relating to a physical card captured while the physical card is flipped from a first side of the physical card to a second side of the physical card;

determine an authenticity of the physical card, wherein the authenticity of the physical card is based at least in part on one or more physical characteristics of the physical card identifiable from the at least one of the video or the lidar data, and wherein the one or more physical characteristics relate to one or more of a thickness of the physical card, a length and width of the physical card, a shape of the physical card, or a design feature of the physical card; and cause, based on a determination that the physical card is authentic, information associated with the physical card to be transmitted or stored to be used in connection with a transaction.

16. The non-transitory computer-readable medium of claim 15, wherein the at least one of the video or the lidar data is only the lidar data.

17. The non-transitory computer-readable medium of claim 15, wherein the video includes a first video of the physical card from a first camera angle, and a second video of the physical card from a second camera angle.

18. The non-transitory computer-readable medium of claim 15, wherein the one or more instructions, that cause the device to determine the authenticity of the physical card, cause the device to:

transmit an authentication request that includes the at least one of the video or the lidar data;

receive an authentication response that includes an indication of the authenticity of the physical card; and determine the authenticity of the physical card based on the indication.

19. The non-transitory computer-readable medium of claim 15, wherein the one or more instructions, that cause the device to determine the authenticity of the physical card, cause the device to:

identify, based on the at least one of the video or the lidar data, the one or more physical characteristics of the physical card; and determine the authenticity of the physical card based on the one or more physical characteristics.

20. The non-transitory computer-readable medium of claim 19, wherein the one or more instructions, that cause the device to obtain the at least one of the video or the lidar data, cause the device to:

obtain the video and the lidar data, and wherein the one or more instructions, that cause the device to identify the one or more physical characteristics of the physical card, cause the device to:

identify, based on the video and the lidar data, the one or more physical characteristics of the physical card.

* * * * *